UNITED STATES PATENT OFFICE.

CARL SCHLEUSSNER, OF HÖCHST-ON-THE-MAIN, GERMANY, ASSIGNOR TO THE FARBWERKE, VORMALS MEISTER, LUCIUS & BRÜNING, OF SAME PLACE.

PROCESS OF MAKING BLACK NAPHTHAZARIN SULFUR DYE.

SPECIFICATION forming part of Letters Patent No. 649,218, dated May 8, 1900.

Application filed January 24, 1900. Serial No. 2,676. (No specimens.)

*To all whom it may concern:*

Be it known that I, CARL SCHLEUSSNER, Ph. D., a citizen of the Empire of Germany, residing at Höchst-on-the-Main, Germany, have invented certain new and useful Improvements in the Manufacture of a Cotton Dyestuff, of which the following is a specification.

In the manufacture of naphthazarin an intermediary product soluble in water is obtained, as mentioned already by Aguiar y Bayer, (*Ber.* 4, p. 440,) which on being heated with dilute acids is transformed into naphthazarin. I have found that this intermediary product when heated with sulfids of alkali metals is transformed into a dyestuff directly dyeing cotton in blue tints, its dyes on subsequent treatment with metallic salts, such as sulfate of copper, becoming a fast and deep black. The best result is obtained if the intermediary product be heated with alkali polysulfids while adding chlorid of zinc.

Example: A mixture of ten kilos of the intermediary product, 1.5 kilos of chlorid of zinc, fifty kilos of crystallized sodium sulfid, and ten kilos of sulfur are heated, on addition of some water with good stirring, to 150° to 180° centigrade till the mass becomes solid and the intensity of color no longer increases. While heating ammonia escapes and the melt turns gradually dark brown. The cold mass is broken up and dissolved in water. The solution is then filtered and evaporated to dryness. The dyestuff thus obtained is a blue-gray powder soluble in water or in solutions of ammonia, alkalies, or alkaline carbonate with a blue color. Mineral acids precipitate the dye acid from the solutions. It is insoluble in water and soluble with difficulty in alcohol.

Having now described my invention, what I claim is—

1. The process herein described of manufacturing a dyestuff dyeing cotton directly in blue shades, its dyes becoming black when subsequently treated with metallic salts, which consists in heating the intermediary product obtained in the manufacture of naphthazarin with sulfids of alkali metals, substantially as set forth.

2. The dyestuff obtained from the intermediary product produced in the manufacture of naphthazarin with sulfids of alkali metals, said dyestuff being a blue-gray powder, soluble in water or in solutions of ammonia alkalies or alkali carbonates with a blue color, the dye acid of the same being precipitated from the solutions by mineral acids and being insoluble in water and soluble with difficulty in alcohol, its dyes on subsequent treatment with sulfate of copper becoming a fast and deep black, substantially as set forth.

In testimony that I claim the foregoing as my invention I have signed my name in presence of two subscribing witnesses.

CARL SCHLEUSSNER.

Witnesses:
    HEINRICH HAHN,
    ALFRED BRISBOIS.